(12) United States Patent
Hanson et al.

(10) Patent No.: US 9,734,643 B2
(45) Date of Patent: Aug. 15, 2017

(54) ACCESSING SECURE AREAS BASED ON IDENTIFICATION VIA PERSONAL DEVICE

(71) Applicant: Bank of America Corporation, Charlotte, NC (US)

(72) Inventors: Carrie Anne Hanson, Charlotte, NC (US); David M. Grigg, Rock Hill, SC (US); Kim Stittsworth, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 148 days.

(21) Appl. No.: 14/327,895

(22) Filed: Jul. 10, 2014

(65) Prior Publication Data

US 2016/0012655 A1    Jan. 14, 2016

(51) Int. Cl.
G07C 9/00    (2006.01)
H04W 4/02    (2009.01)
(Continued)

(52) U.S. Cl.
CPC ...... *G07C 9/00039* (2013.01); *G07C 9/00111* (2013.01); *H04W 4/02* (2013.01); *Y02B 60/50* (2013.01)

(58) Field of Classification Search
CPC ....... G07C 9/00; G07C 9/00039; H04W 4/02; G08B 19/00
(Continued)

(56) References Cited

U.S. PATENT DOCUMENTS

| 5,581,630 A | * | 12/1996 | Bonneau, Jr. ...... G07C 9/00079 |
| | | | 235/380 |
| 5,991,749 A | * | 11/1999 | Morrill, Jr. ............ G06Q 20/04 |
| | | | 705/13 |

(Continued)

FOREIGN PATENT DOCUMENTS

KR    20090050383 A    5/2009

OTHER PUBLICATIONS

This application is related to co-pending U.S. Appl. Nos. 14/327,560; 14/327,561; 14/327,565; 14/327,566; 14/327,568; 14/327,569; 14/327,570; 14/327,688; 14/327,728; 14/327,767; 14/327,843; 14/327,847; 14/327,934; 14/327,967; 14/328,012; 14/328,079; and 14/328,147.

*Primary Examiner* — Nam V Nguyen
(74) *Attorney, Agent, or Firm* — Banner & Witcoff, Ltd.; Michael A. Springs

(57) ABSTRACT

Systems and methods for using proximity positioning systems to determine a location of a user, identify the user and provide additional services and/or functionality to the user based on the determined location and/or identity are presented. In some examples, a low-power radio signal emitted from a location beacon may be received or detected by a personal computing device. The location of the beacon, and the device detecting the signal, may be determined. The location information, as well as a unique identifier associated with the personal computing device, may be used to identify a user associated with the personal computing device and the location of the user. This information may be used to provide additional services and/or functionality to the user. For instance, the location and identity information may be used to provide the user with access to secure areas within a location.

20 Claims, 12 Drawing Sheets

(51) Int. Cl.
　　　*G08B 19/00*　　　(2006.01)
　　　*G06K 9/00*　　　(2006.01)

(58) Field of Classification Search
　　　USPC ........ 705/44, 13, 39; 455/456.1, 422.1, 458;
　　　　　　　340/825.43, 5.25; 713/186, 172
　　　See application file for complete search history.

(56) References Cited

U.S. PATENT DOCUMENTS

| | | | |
|---|---|---|---|
| 6,513,015 B2 | 1/2003 | Ogasawara | |
| 6,593,856 B1* | 7/2003 | Madau | G05B 19/0428 340/12.27 |
| 6,624,739 B1* | 9/2003 | Stobbe | G07C 9/00087 235/382 |
| 6,738,628 B1* | 5/2004 | McCall | G01S 1/68 340/8.1 |
| 6,845,361 B1 | 1/2005 | Dowling | |
| 7,047,560 B2 | 5/2006 | Fishman et al. | |
| 7,111,174 B2* | 9/2006 | Hamid | G06F 21/32 340/5.52 |
| 7,149,533 B2 | 12/2006 | Laird et al. | |
| 7,181,252 B2* | 2/2007 | Komsi | H04M 1/66 455/558 |
| 7,466,224 B2* | 12/2008 | Ward | G07C 9/00111 340/5.2 |
| 7,536,316 B2 | 5/2009 | Ozer et al. | |
| 7,536,722 B1 | 5/2009 | Saltz et al. | |
| 7,543,738 B1* | 6/2009 | Saunders | G06K 9/00 235/375 |
| 7,552,800 B2* | 6/2009 | Puskala | B66B 1/468 187/384 |
| 7,712,657 B1 | 5/2010 | Block et al. | |
| 7,774,076 B2 | 8/2010 | Skowronek | |
| 7,814,016 B2 | 10/2010 | Pranger | |
| 7,904,718 B2* | 3/2011 | Giobbi | G06Q 20/341 340/5.6 |
| 7,911,334 B2 | 3/2011 | Busey | |
| 7,912,843 B2 | 3/2011 | Murdock et al. | |
| 7,969,285 B2* | 6/2011 | Bauchot | G07C 9/00111 340/10.41 |
| 7,979,899 B2 | 7/2011 | Guo et al. | |
| 8,009,013 B1 | 8/2011 | Hirschfeld et al. | |
| 8,055,551 B2 | 11/2011 | Milgramm et al. | |
| 8,073,460 B1 | 12/2011 | Scofield et al. | |
| 8,078,146 B2* | 12/2011 | Jayappa | G07C 9/00111 340/10.4 |
| 8,091,778 B1 | 1/2012 | Block et al. | |
| 8,093,988 B2* | 1/2012 | Takene | G07C 9/00111 340/5.64 |
| 8,145,649 B2 | 3/2012 | Murdock et al. | |
| 8,186,578 B1 | 5/2012 | Block et al. | |
| 8,201,729 B1 | 6/2012 | Block et al. | |
| 8,229,787 B2 | 7/2012 | Ramchandani et al. | |
| 8,232,860 B2* | 7/2012 | Goel | G06F 21/35 235/379 |
| 8,259,692 B2 | 9/2012 | Bajko | |
| 8,260,707 B2 | 9/2012 | Treadwell et al. | |
| 8,295,898 B2 | 10/2012 | Ashfield et al. | |
| 8,332,232 B2 | 12/2012 | Nickerson et al. | |
| 8,369,266 B2 | 2/2013 | Jin et al. | |
| 8,401,897 B1 | 3/2013 | Chatterjee | |
| 8,413,209 B2* | 4/2013 | Aldera | H04L 63/102 713/185 |
| 8,413,891 B2 | 4/2013 | Long | |
| 8,467,768 B2 | 6/2013 | Mahaffey et al. | |
| 8,543,828 B2* | 9/2013 | Albisu | G06F 21/35 705/72 |
| 8,583,933 B2 | 11/2013 | Granbery | |
| 8,590,028 B2 | 11/2013 | Saxena et al. | |
| 8,606,712 B2 | 12/2013 | Choudhuri et al. | |
| 8,627,422 B2* | 1/2014 | Hawkes | H04L 63/166 380/255 |
| 8,666,821 B1 | 3/2014 | Xie et al. | |
| 8,671,001 B1 | 3/2014 | Thompson et al. | |
| 8,742,894 B2* | 6/2014 | Seydoux | H05B 37/0272 340/10.1 |
| 9,166,967 B2* | 10/2015 | Berkovitz | G06F 21/41 |
| 9,204,257 B1* | 12/2015 | Mendelson | G08G 1/14 |
| 9,265,450 B1* | 2/2016 | Giobbi | G06K 19/0718 |
| 9,317,672 B2* | 4/2016 | Carlson | G06F 21/31 |
| 9,365,393 B2* | 6/2016 | Salmikuukka | B66B 1/3461 |
| 9,367,978 B2* | 6/2016 | Sullivan | G07C 9/00571 |
| 2006/0119469 A1 | 6/2006 | Hirai et al. | |
| 2007/0186258 A1 | 8/2007 | Dapper et al. | |
| 2007/0186261 A1 | 8/2007 | Geile et al. | |
| 2007/0192815 A1 | 8/2007 | Geile et al. | |
| 2007/0195689 A1 | 8/2007 | Dapper et al. | |
| 2007/0195901 A1 | 8/2007 | Geile et al. | |
| 2007/0195952 A1 | 8/2007 | Geile et al. | |
| 2007/0201573 A1 | 8/2007 | Geile et al. | |
| 2007/0206693 A1 | 9/2007 | Geile et al. | |
| 2008/0052151 A1 | 2/2008 | Xie et al. | |
| 2008/0114697 A1 | 5/2008 | Black et al. | |
| 2009/0252318 A1 | 10/2009 | Smith et al. | |
| 2009/0259499 A1 | 10/2009 | Bhojwani et al. | |
| 2009/0328052 A1 | 12/2009 | Nguyen et al. | |
| 2009/0328182 A1 | 12/2009 | Malakapalli et al. | |
| 2010/0017874 A1 | 1/2010 | Piccinini et al. | |
| 2010/0042541 A1 | 2/2010 | Kang et al. | |
| 2010/0191581 A1 | 7/2010 | Furin et al. | |
| 2010/0198725 A1 | 8/2010 | Naccache | |
| 2010/0205063 A1 | 8/2010 | Mersky | |
| 2010/0277276 A1* | 11/2010 | Bayne | G07C 9/00111 340/5.21 |
| 2010/0287250 A1 | 11/2010 | Carlson et al. | |
| 2011/0086646 A1 | 4/2011 | Gupta et al. | |
| 2011/0202377 A1 | 8/2011 | Maiya et al. | |
| 2011/0208657 A1 | 8/2011 | Rao | |
| 2011/0246306 A1 | 10/2011 | Blackhurst et al. | |
| 2011/0313804 A1 | 12/2011 | Camp et al. | |
| 2011/0321031 A1 | 12/2011 | Dournov et al. | |
| 2012/0004769 A1 | 1/2012 | Hallenbeck et al. | |
| 2012/0047072 A1 | 2/2012 | Larkin | |
| 2012/0070041 A1 | 3/2012 | Wang | |
| 2012/0076183 A1 | 3/2012 | Dapper et al. | |
| 2012/0078673 A1 | 3/2012 | Koke et al. | |
| 2012/0078741 A1 | 3/2012 | Deline | |
| 2012/0116929 A1 | 5/2012 | Gventer et al. | |
| 2012/0130840 A1 | 5/2012 | Carlier et al. | |
| 2012/0136479 A1 | 5/2012 | Signorelli et al. | |
| 2012/0143755 A1 | 6/2012 | Burrell | |
| 2012/0158297 A1 | 6/2012 | Kim et al. | |
| 2012/0195184 A1 | 8/2012 | Dapper et al. | |
| 2012/0197773 A1 | 8/2012 | Grigg et al. | |
| 2012/0197797 A1 | 8/2012 | Grigg et al. | |
| 2012/0197798 A1 | 8/2012 | Grigg et al. | |
| 2012/0203892 A1 | 8/2012 | Pignataro et al. | |
| 2012/0271692 A1 | 10/2012 | Huang et al. | |
| 2012/0278115 A1 | 11/2012 | Acharya et al. | |
| 2012/0278234 A1 | 11/2012 | Dent et al. | |
| 2012/0320199 A1 | 12/2012 | Kundu et al. | |
| 2012/0320214 A1 | 12/2012 | Kundu et al. | |
| 2012/0321146 A1 | 12/2012 | Kundu et al. | |
| 2012/0323642 A1 | 12/2012 | Camp et al. | |
| 2013/0005253 A1 | 1/2013 | Grigg et al. | |
| 2013/0030915 A1 | 1/2013 | Statler et al. | |
| 2013/0045758 A1 | 2/2013 | Khorashadi et al. | |
| 2013/0048724 A1 | 2/2013 | Burnside et al. | |
| 2013/0104214 A1 | 4/2013 | Beck et al. | |
| 2013/0121131 A1 | 5/2013 | Dapper et al. | |
| 2013/0138497 A1 | 5/2013 | Yan et al. | |
| 2013/0150006 A1 | 6/2013 | Nunally et al. | |
| 2013/0159195 A1* | 6/2013 | Kirillin | G06Q 20/322 705/71 |
| 2013/0165154 A1 | 6/2013 | Joshi | |
| 2013/0173387 A1 | 6/2013 | Adelaar | |
| 2013/0173404 A1 | 7/2013 | Scipioni | |
| 2013/0173492 A1 | 7/2013 | Leavenworth et al. | |
| 2013/0182114 A1 | 7/2013 | Zhang et al. | |
| 2013/0182904 A1 | 7/2013 | Zhang et al. | |
| 2013/0203383 A1 | 8/2013 | Stopel et al. | |
| 2013/0211718 A1 | 8/2013 | Yoo et al. | |

(56) References Cited

U.S. PATENT DOCUMENTS

| | | |
|---|---|---|
| 2013/0217416 A1 | 8/2013 | Matthews, III et al. |
| 2013/0238497 A1 | 9/2013 | Ramachandran et al. |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0275163 A1 | 10/2013 | Kaiser |
| 2013/0282744 A1 | 10/2013 | Hartman et al. |
| 2013/0297422 A1 | 11/2013 | Hunter et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0346189 A1 | 12/2013 | Isaacs |
| 2014/0006219 A1 | 1/2014 | Wouhaybi et al. |
| 2014/0020073 A1 | 1/2014 | Ronda et al. |
| 2014/0032297 A1 | 1/2014 | Germann et al. |
| 2014/0032345 A1 | 1/2014 | Moore |
| 2014/0039950 A1 | 2/2014 | Appel et al. |
| 2014/0039951 A1 | 2/2014 | Appel et al. |
| 2014/0046830 A1 | 2/2014 | Orozco et al. |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0105263 A1 | 4/2014 | Geile |
| 2014/0110481 A1 | 4/2014 | Burnside et al. |
| 2014/0114877 A1 | 4/2014 | Montano |
| 2014/0201025 A1 | 7/2014 | Adoni et al. |
| 2014/0222603 A1 | 8/2014 | Hay |
| 2014/0258028 A1 | 9/2014 | Bynum et al. |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0279450 A1 | 9/2014 | Gujral |
| 2014/0297527 A1 | 10/2014 | McLaughlin et al. |
| 2014/0309770 A1 | 10/2014 | Signorelli et al. |
| 2015/0059002 A1 | 2/2015 | Balram et al. |
| 2015/0089585 A1 | 3/2015 | Novack |

* cited by examiner

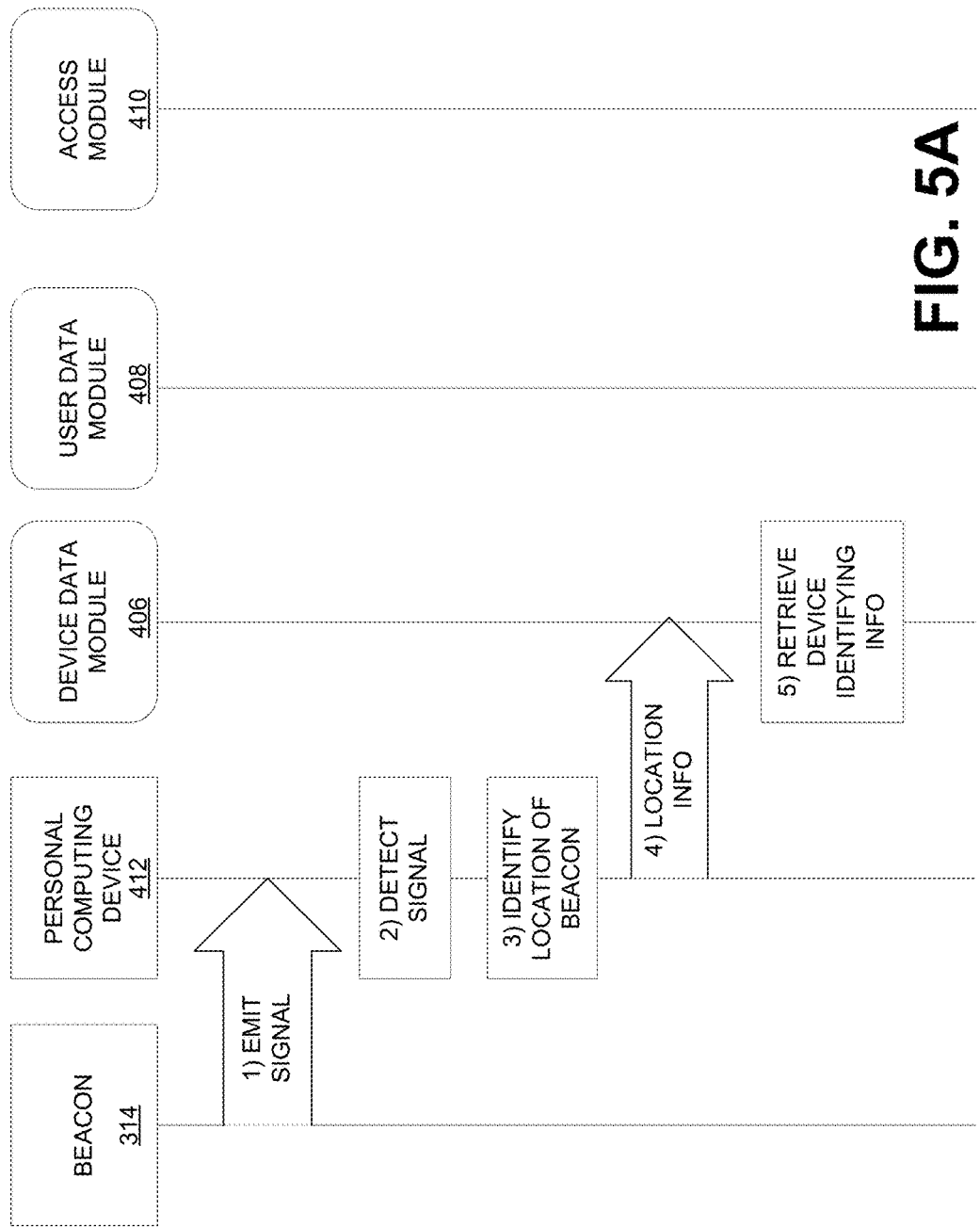

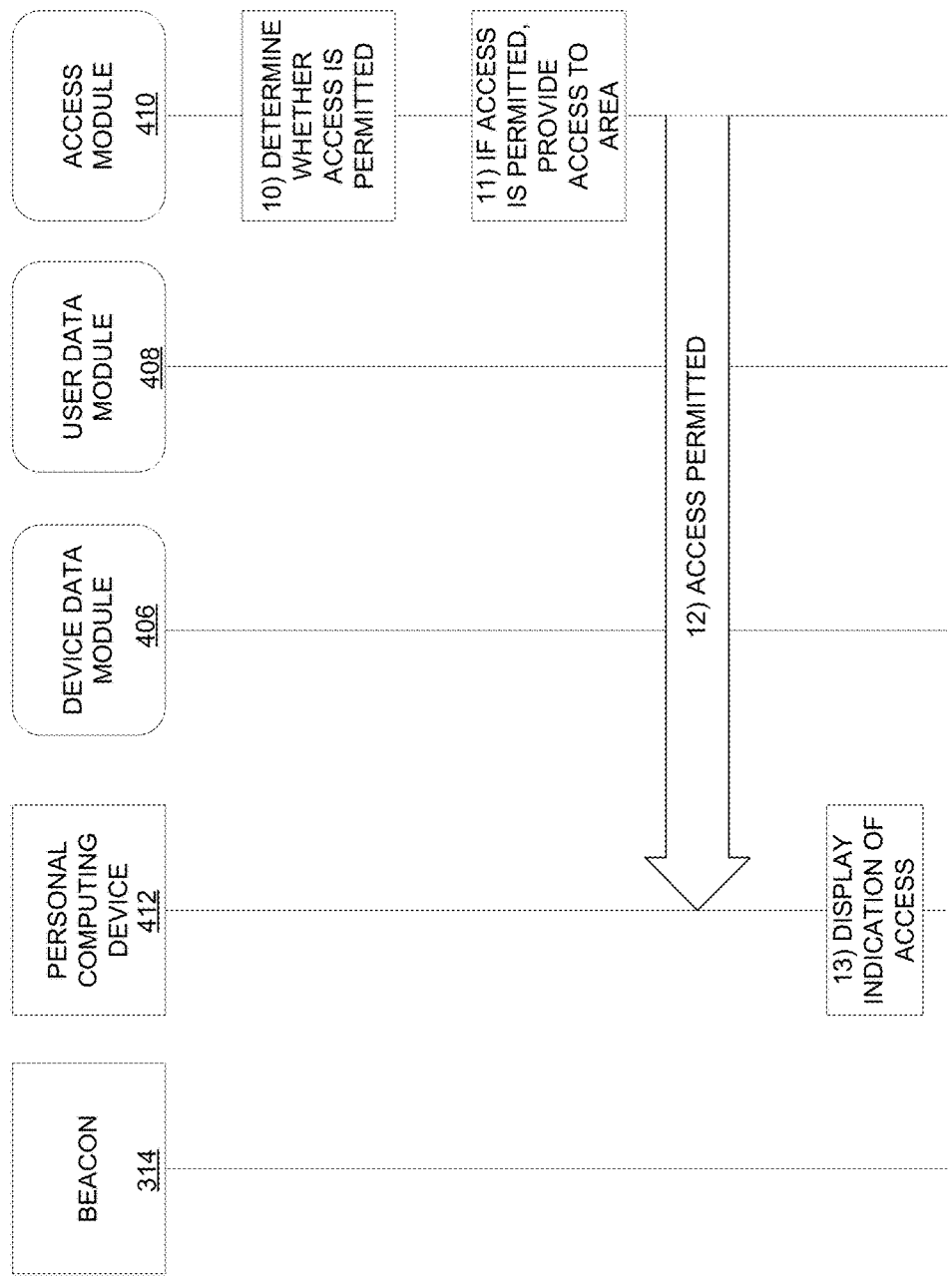

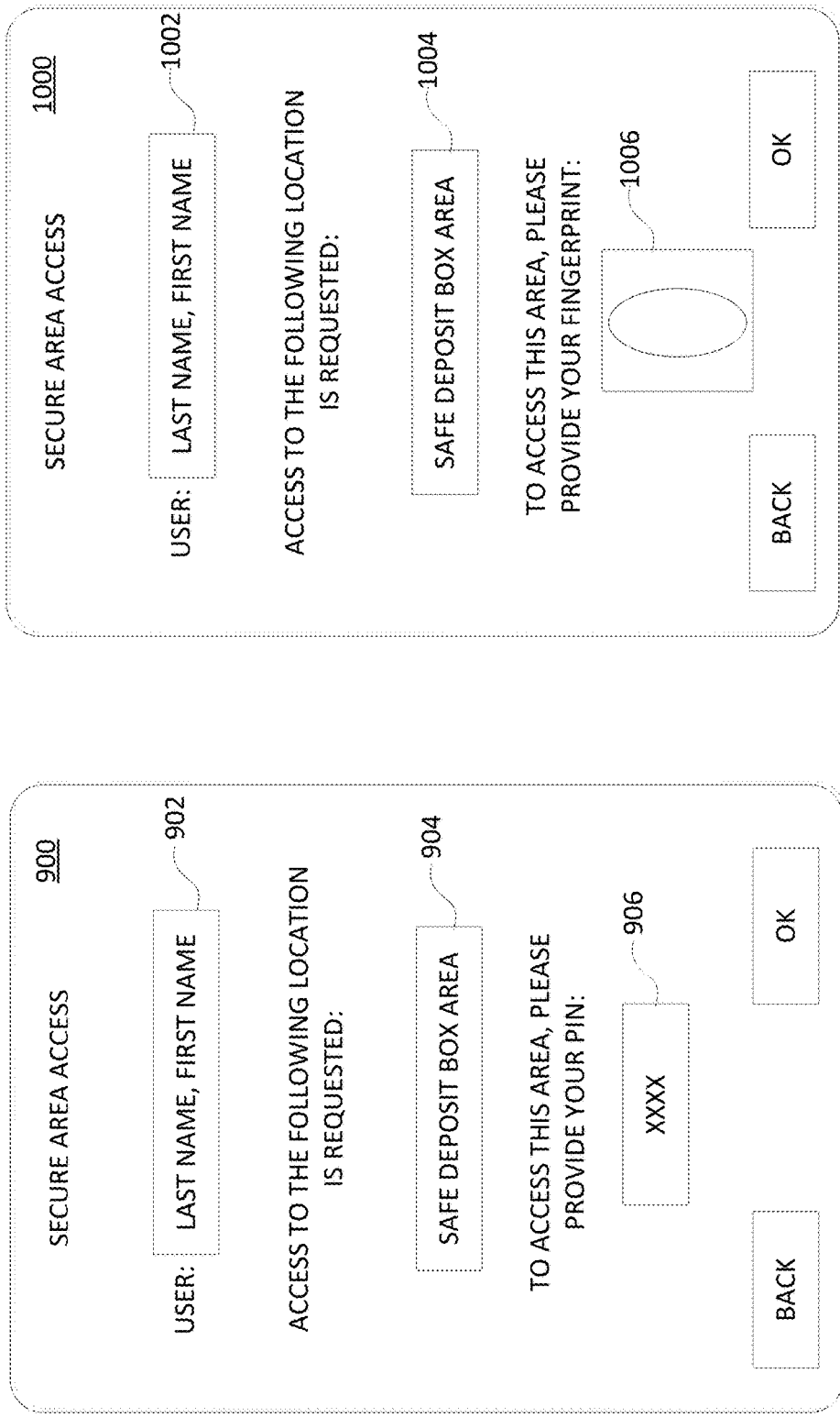

ACCESSING SECURE AREAS BASED ON IDENTIFICATION VIA PERSONAL DEVICE

BACKGROUND

Companies that have a service component are often looking for ways to improve the experience that customers have when interacting with the company or its representatives, associates, and the like. Given the hectic schedules of people these days, it is important to provide efficient and effective customer service or assistance. Companies are also often trying to improve the efficiency of services provided to a customer. For instance, by automatically initiating processes and/or reducing the number of steps the customer must perform manually, the overall customer experience may be enhanced and/or improved.

SUMMARY

Aspects of the disclosure relate to various systems, methods, apparatuses, and computer-readable media configured to use proximity positioning systems to determine a location of a user, identify the user and provide additional services and/or functionality to the user based on the determined location and/or identity. In some examples, a signal may be received or detected. The signal may be a low-power radio signal detectable within a predefined proximity and emitting from a location beacon. The signal may, in some examples, be detected by a personal computing device of a user. The location of the beacon, and the device detecting the signal, may be determined (e.g., based on previously stored location information associated with the beacon). The location information, as well as a unique identifier associated with the personal computing device of the user, may be used to identify a user associated with the personal computing device and the location of the user. This information may be used to provide additional services and/or functionality to the user.

For instance, in some arrangements, the determined identity of the user may be used to determine whether a user is entitled to access a secure area within a location associated with the location beacon. In some examples, the identity of the user may be used to determine whether the user is entitled to access and, if so, provide access to the secure area. In some arrangements, once it is determined that the user is entitled to access the secure area, additional authenticating information may be requested from the user, such as a personal identification number (PIN) or biometric data. This additional data may be used to determine whether the user is authorized to access the secure area and, if so, provide access.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5C depict an illustrative event sequence for identifying a user, such as via a personal device of the user, and providing access to a secure area based on the determined identification according to one or more aspects discussed herein;

FIGS. 9 and 10 illustrate example user interfaces for requesting additional authenticating information from a user according to one or more aspects discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
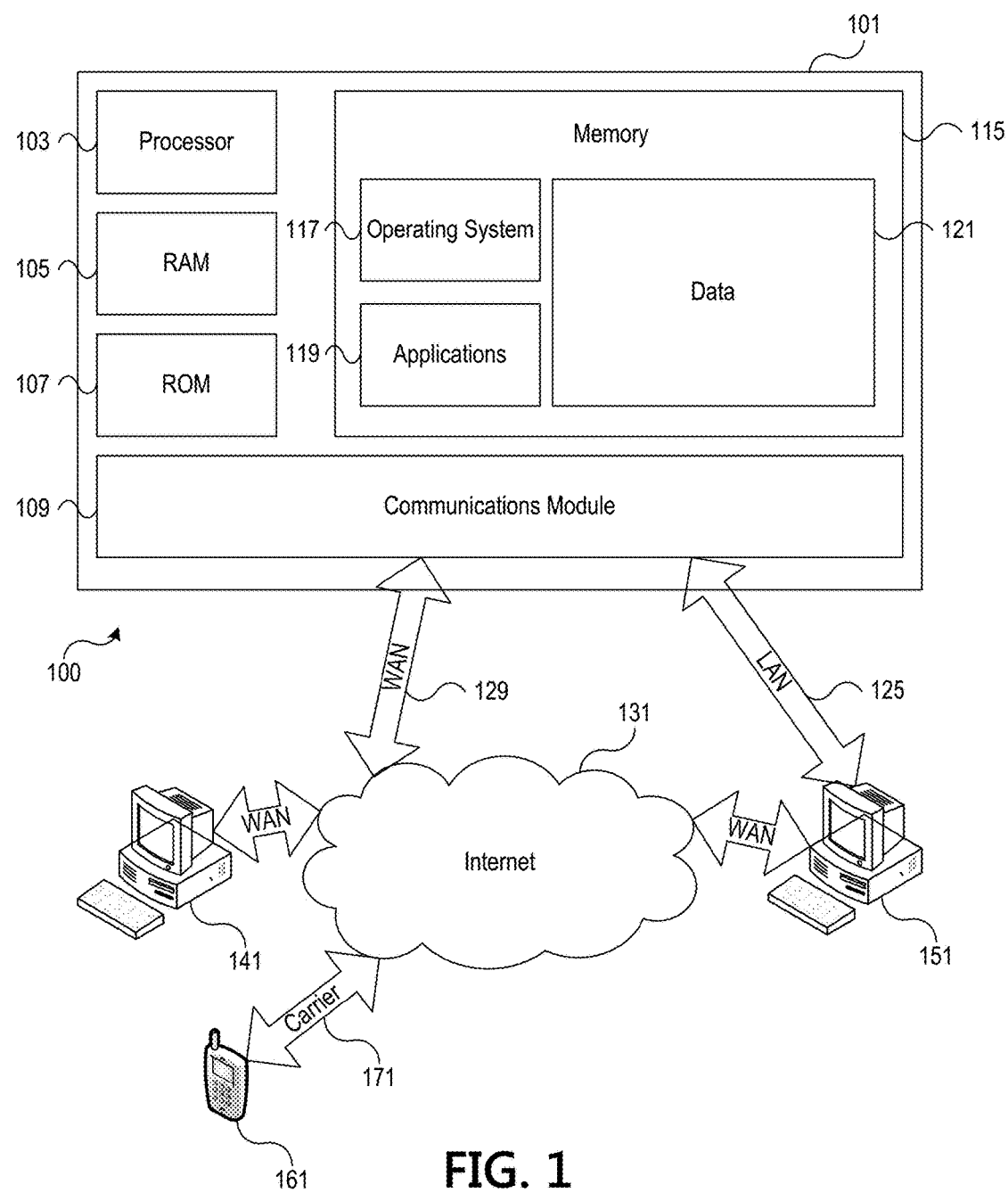
FIG. 1 depicts an illustrative operating environment in which various aspects of the disclosure may be implemented in accordance with one or more aspects discussed herein.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
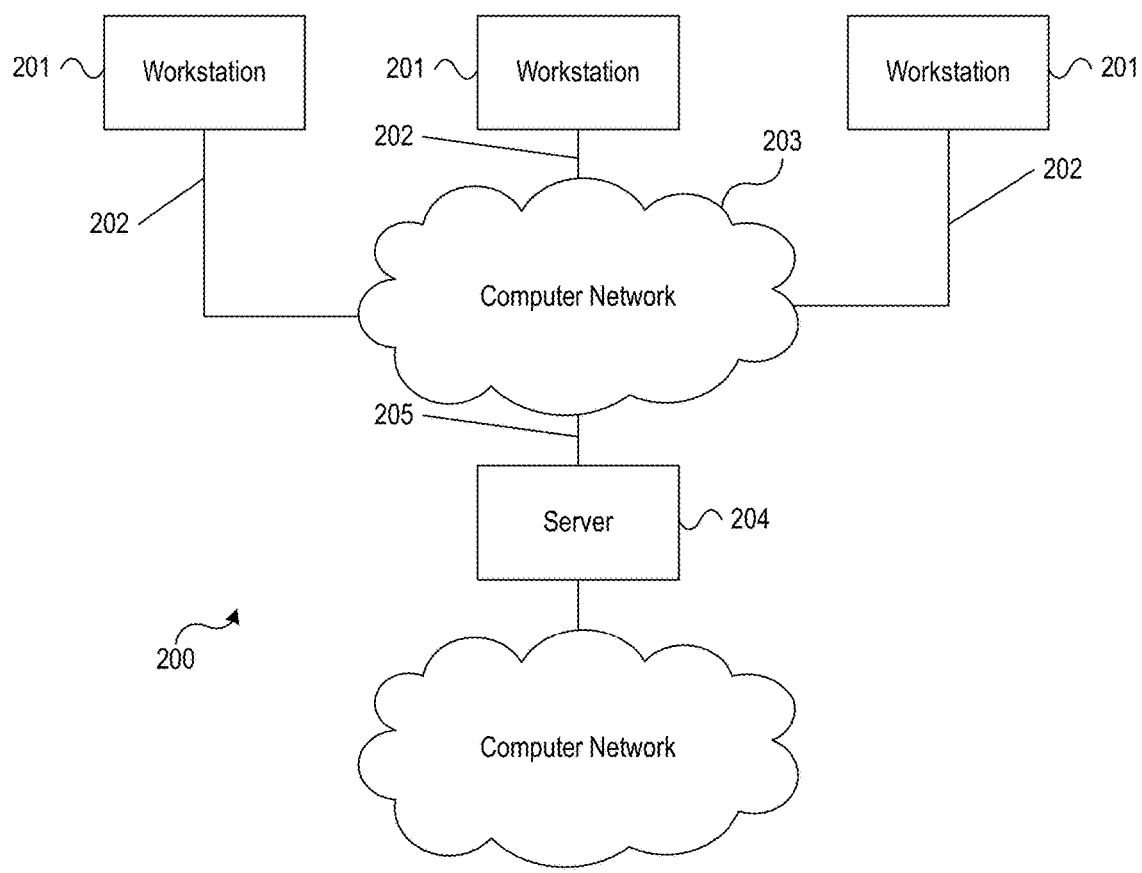
FIG. 2 depicts an illustrative block diagram of workstations and servers that may be used to implement the processes and functions of certain aspects of the present disclosure in accordance with one or more aspects discussed herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
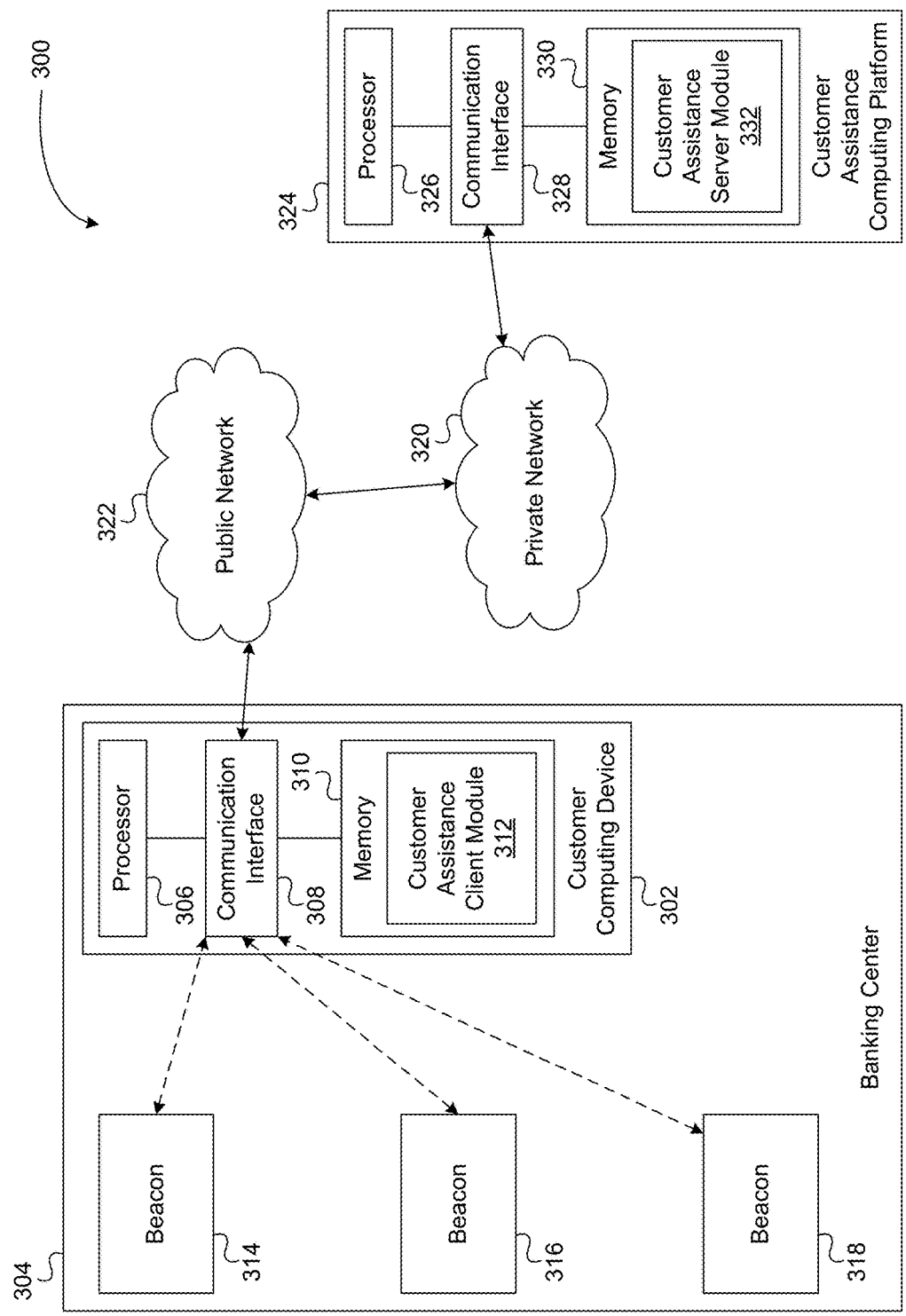
FIG. 3 depicts an illustrative computing environment for a proximity positioning system that may be used to provide location determination, user identification and access to secure areas in accordance with one or more aspects discussed herein.

FIG. 3 depicts an illustrative computing environment for a proximity positioning system providing location determination and user identification in accordance with one or more example embodiments. Referring to FIG. 3, computing environment 300 may include one or more computing devices, such as customer or personal computing device 302. Customer computing device 302 may be any type of computing device capable of receiving a user interface, receiving input via the user interface, and communicating the received input to one or more other computing devices. For example, customer or personal computing device 302 may be a desktop computer, laptop computer, tablet computer, smart phone, or the like. In one or more arrangements, customer computing device 302 may be a mobile, personal computing device (e.g., a smart phone, a tablet computer, or any other type of mobile device) that belongs to and/or is used by a customer of a financial institution at and/or near a banking center 304 and/or any other location operated by, controlled by, and/or otherwise associated with the financial institution.

Computing environment 300 also may include one or more location beacons, such as location beacon 314, location beacon 316, and location beacon 318. Each location beacon (e.g., location beacon 314, location beacon 316, and location beacon 318) may be configured to transmit one or more radio signals that may be detected and/or received by other devices located in close proximity of and/or otherwise within a predetermined distance of the particular location beacon. In one or more embodiments, any and/or all of the location beacons included in computing environment 300 (e.g., location beacon 314, location beacon 316, and location beacon 318) may implement Bluetooth Low Energy (also referred to as "Bluetooth LE," "Bluetooth Smart," or "BLE") technology to transmit low-power radio signals. The particular signal(s) transmitted by a particular location beacon may include one or more attributes, such as a unique identifier assigned to and/or otherwise associated with the particular location beacon, that may enable the particular location beacon to be identified by a device receiving the particular signal(s) transmitted by the particular location beacon. As illustrated below, by detecting a particular signal transmitted by a location beacon (which may, e.g., be positioned at a specific location) and subsequently identifying the location beacon transmitting the particular signal, a computing device may be able to determine that it is located at and/or near the specific location where the location beacon is positioned.

For example, in one or more arrangements discussed below, the one or more location beacons (e.g., location beacon 314, location beacon 316, and location beacon 318) may be positioned at and/or near banking center 304, and may be specifically positioned at and/or near different areas of banking center 304, such as at a welcome area, at a teller counter or window, at a waiting area, at an external alcove where an automated teller machine (ATM) is located, at an external window where drive-up services are provided, at a parking lot, and/or in one or more other distinct areas of banking center 304. In addition, each location beacon may transmit a radio signal that may be detected and/or received by other devices at banking center 304, such as customer computing device 302, which may enable such devices to determine that they are present at banking center 304 and/or located at and/or near a particular area of banking center 304.

In one or more embodiments, customer or personal computing device 302 may include at least one processor 306, communication interface 308, and/or memory 310. A data bus may interconnect processor 306, communication interface 308, and/or memory 310. Memory 310 may include one or more program modules comprising instructions that when executed by processor 306 cause customer computing device 302 to perform one or more functions described herein. For example, memory 310 may include customer assistance client module 312, which may include instructions that when executed by processor 306 cause customer computing device 302 to perform one or more functions described herein. Communication interface 308 may include one or more wired and/or wireless communication interfaces (e.g., network interfaces, radio interfaces, or the like) that are configured to support communication between customer computing device 302 and one or more other devices and/or networks. In one or more arrangements, communication interface 308 may include at least one network interface that facilitates communication between customer computing device 302 and one or more devices and/or networks that are located remotely from banking center 304, and communication interface 308 may further include at least one radio interface that facilitates communication between and/or enables customer computing device 302 to receive wireless radio signals from one or more location beacons (e.g., location beacon 314, location beacon 316, and location beacon 318) and/or other radio transmitters that may be located at and/or near banking center 304.

Computing environment 300 also may include one or more computing platforms. For example, computing environment 300 may include customer assistance computing platform 324. Customer assistance computing platform 324 may include one or more computing devices configured to perform one or more of the functions described herein. For example, customer assistance computing platform 324 may include one or more computers (e.g., laptop computers, desktop computers, servers, server blades, or the like).

Computing environment 300 also may include one or more networks, which may interconnect customer computing device 302, customer assistance computing platform 324, and/or one or more other computing devices. For example, computing environment 300 may include private network 320 and public network 322. Private network 320 and/or public network 322 may include one or more sub-networks (e.g., LANs, WANs, or the like). Private network 320 may be associated with a particular organization (e.g., a corporation, financial institution, educational institution, governmental institution, or the like) and may interconnect one or more computing devices associated with the organization. For example, customer assistance computing platform 324 may be associated with an organization, such as the financial institution that operates, controls, and/or is otherwise associated with banking center 304, and private network 320 may be operated by and/or otherwise associated with the organization, and may include one or more networks (e.g., LANs, WANs, VPNs, or the like) that interconnect customer assistance computing platform 324 and one or more other computing devices associated with the organization. Public network 322 may connect private network 320 and/or one or more computing devices connected thereto (e.g., customer assistance computing platform 324) with one or more networks and/or computing devices that are not associated with the organization. For example, customer computing device 302 might not be associated with the organization that operates and/or is associated with private network 320, and public network 322 may include one or more networks (e.g., the Internet) that connect customer computing device 302 to private network 320 and/or one or more computing devices connected thereto (e.g., customer assistance computing platform 324).

Customer assistance computing platform 324 may include at least one processor 326, communication interface 328, and/or memory 330. Memory 330 may include one or more program modules comprising instructions that when executed by processor 326 cause customer assistance computing platform 324 to perform one or more functions described herein. For example, memory 330 may include customer assistance server module 332, which may include instructions that when executed by processor 326 cause customer assistance computing platform 324 to perform one or more functions described herein. Communication interface 328 may include one or more wired and/or wireless communication interfaces (e.g., network interfaces, radio interfaces, or the like) that are configured to support communication between customer assistance computing platform 324 and one or more other devices and/or networks. For example, communication interface 328 may include at least one network interface that facilitates communication between customer assistance computing platform 324 and one or more other devices and/or networks (e.g., private network 320, public network 322, customer computing device 302, and/or other devices and networks).

Figure 4:
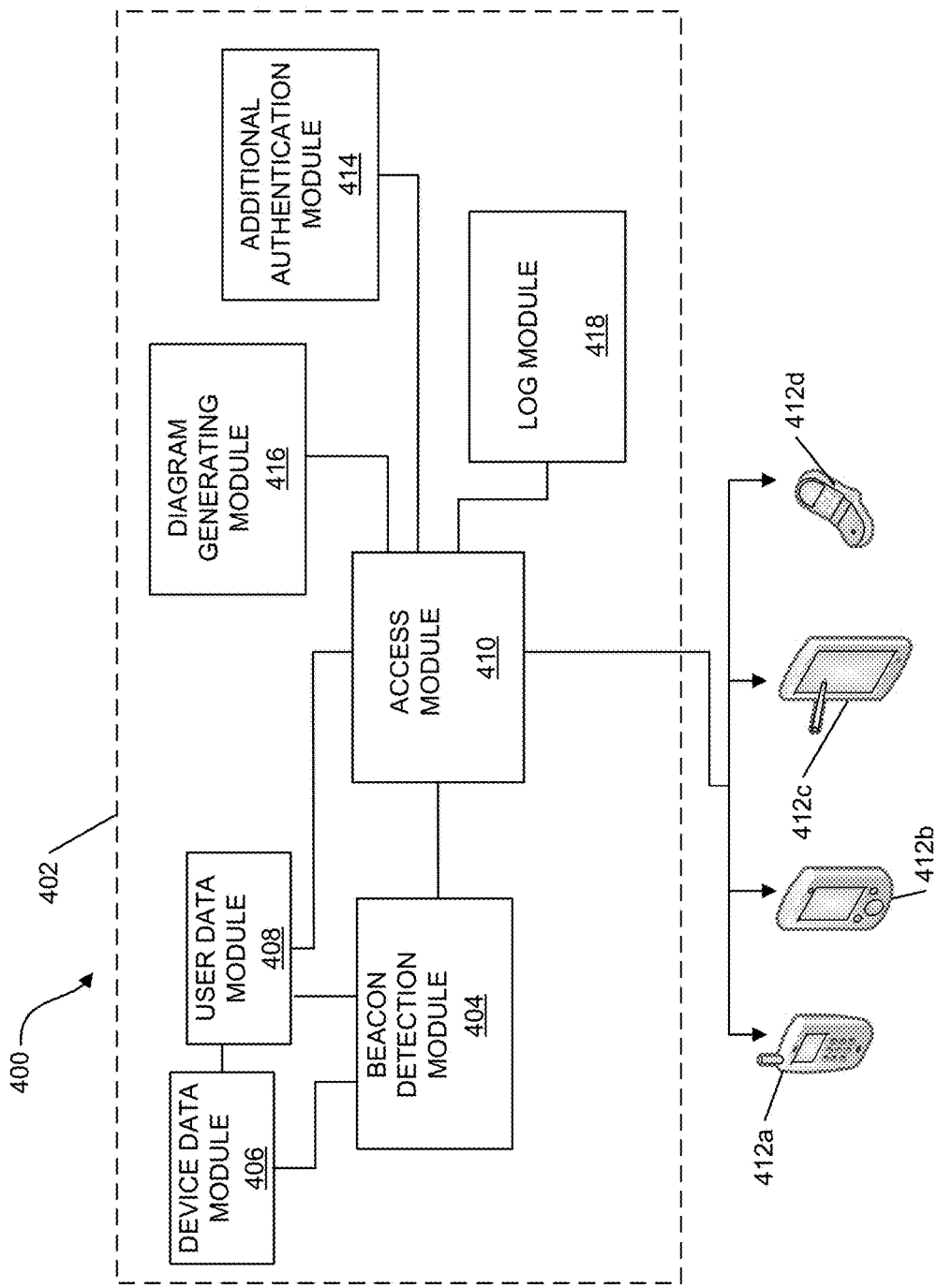
FIG. 4 illustrates one example location determination and user identification system according to one or more aspects discussed herein.

FIG. 4 illustrates one example location determination and user identification system 400 according to one or more aspects described herein. In some examples, the location determination and user identification system 400 may be part of, internal to or associated with an entity 402. The entity 402 may be a corporation, university, government entity, and the like. In some examples, the entity 402 may be a financial institution, such as a bank. Although various aspects of the disclosure may be described in the context of a financial institution, nothing in the disclosure shall be construed as limiting the location determination and user identification system to use within a financial institution. Rather, the system may be implemented by various other types of entities.

Further some aspects of the location determination and user identification system 400 may be contained in one or more computing devices, servers, or the like. For instance, the location determination and user identification system 400 may include one or more modules that may be implemented in hardware and/or software configured to perform various functions within the system 400. One or more modules may be contained within the same physical device or may be housed in separate devices. Further, although one or more modules may be shown in FIG. 4 as within the entity 402, one or more modules may be located external to the entity 402 but may be associated with the entity. For instance, one or more modules may be associated with a personal computing device of a user. Accordingly, various functionality associated with the module may be performed at the personal computing device which may be located external to the entity but may be associated with the entity by way of a user associated with the device being associated with the entity 402, the device including or running an application, such as a mobile banking application, of the entity 402, and the like. Nothing in the disclosure should be viewed as limiting the one or more modules to a same physical location or a location within an entity.

Location determination and user identification system 400 may include a beacon detection module 404. The beacon detection module 404 may be implemented in hardware and/or software and may be configured to perform various functions within the system 400. For instance, the beacon detection module 404 may be configured to detect and/or receive a signal associated with one or more beacons, such as location beacons 314, 316, 318 in FIG. 3. The location beacons may be arranged within or in proximity to a location and may be part of a proximity positioning system that may be used to identify a location of a computing device and, accordingly, a user associated with the computing device, as will be discussed more fully below.

The beacon detection module 404 may receive a signal emitted from one or more location beacons and may determine a location of the beacon and/or a personal computing device associated with a user that is within a predefined proximity of one or more location beacons. For instance, if a personal computing device, such as one of devices 412a-412d is in a location that is within a predefined proximity of one or more location beacons emitting a signal, the personal computing device 412a-412d (e.g., via the beacon detection module 404) may detect the signal and determine, such as from the received signal, a location of the beacon and/or a location of the device. In some examples, an application on the personal computing device 412a-412d may be used to detect the signal from the beacon and/or determine a location of the beacon and/or personal computing device 412a-412d. In other examples, signal data may be transmitted to another component of the system for location identification.

The signal received from the beacon and/or data associated with the signal (such as location data) may be transmitted to a device data module 406. The device data module 406 may be implemented in hardware and/or software configured to perform various functions within the system. For instance, the device data module 406 may receive the signal from the beacon or data associated therewith from the beacon detection module 404 and may determine an identifier associated with the personal computing device 412a-412d associated with the beacon detection module 404 that detected the beacon. That is, the device data module 406 may determine a unique identifier, such as a phone number associated with a smart phone 412a, an international mobile station equipment identity (IMEI), or other unique identifier associated with the personal computing device within the predefined proximity of the beacon.

The signal from the beacon detection module 404 and/or the device identifier from the device data module 406 may be transmitted to a user data module 404. In some examples, the user data module 408 may be located remotely from the beacon detection module 404 and/or the device data module 406. For instance, the user data module 408 may be located in, for example, a back office of a financial institution. The user data module 408 may be implemented in hardware and/or software configured to perform various functions within the system 400. For instance, the user data module 408 may receive data from the beacon detection module 404 associated with a location of the beacon and/or a location of the personal computing device detecting the beacon signal. The user data module 408 may also receive the unique identifier retrieved from the device data module 406 to determine a user associated with the device and, therefore, a location of the user associated with the device based on the location of the device.

In some arrangements, a user may register with the system 400. Registration with the system 400 may include registering a unique identifier associated with one or more personal computing devices of the user. Registration with the system 400 may also include providing identifying information associated with the user. For instance, a name, address, phone number, online or mobile banking user identification, and the like, may be provided in registering with the system. In some examples, the system 400 may obtain registration information directly from the user (e.g., via an online or other direct registration process). Additionally or alternatively, the system 400 may obtain some or all of the registration information from information a user provided to an online banking application, mobile banking application, or the like.

In some arrangements, the registration information may be stored in the user data module 408. Accordingly, upon receiving information associated with a beacon signal and/or a unique identifier associated with a personal computing device, the user data module 408 may determine or identify a user associated with the personal computing device. Thus, the fact that the device associated with the user has detected a beacon signal indicates that the device is within a predefined proximity of the beacon and, accordingly, the user is also (at least likely) within the same proximity of the beacon. If the beacon is located within a particular location, such as a branch or banking center of a financial institution, this information may be used to determine when a user is within the branch or banking center and provide additional services, functionality, etc. based on the identification of the user and determination of the location of the user based on the determined location of the personal computing device associated with the user.

One example of an additional service or functionality that may be provided to a user based on the determined identification and location of the user may be providing access to one or more secure areas within the location (e.g., the branch or banking center of the financial institution). For example, many locations have areas that have restricted or limited access in order to provide additional security for the area. These secure areas may, in conventional systems, be accessible via a key. However, a user desiring to access a secure area might not have the appropriate key with them, may have lost the key, or the like.

For instance, safe deposit boxes within a financial institution are often maintained in a secure area. Accordingly, users desiring to access one or more safe deposit boxes must first obtain access to the secure area. In some conventional arrangements, this may require providing photo identification, presentation and/or use of a key to access the secure area, or the like. However, the system 400 may simplify this process by identifying the user based on the determined location of the personal computing device associated with the user (e.g., a physical presence of the user within the location) and providing access based on that information.

The system 400 may include an access module 410. The access module 410 may be implemented in hardware and/or software configured to perform various functions within the system 400. For instance, the access module 410 may receive user identification information received from user data module 408, as well as determined location information associated with the user based on the determined location of the personal computing device 412a-412d associated with the user, to provide access to one or more secure areas within the location. For instance, the access module 410 may receive identification information and location information and may determine whether the identified user is entitled or authorized to access a secure area. In some examples, the location information obtained from the beacon signal may include a particular portion or area within the larger location (e.g., a particular area within the branch of the financial institution). Accordingly, detection of the signal from a beacon may indicate that a user (based on the determined location of the personal computing device associated with the user) is within a predefined proximity of a certain area within the branch, such as a secure area containing safe deposit boxes. The access module 410 may then determine whether the user is entitled to access the secure location or area nearest the beacon location. Accordingly, if a branch or banking center of a financial institution includes multiple secure areas, the access module 410 may determine whether the user is entitled to access the secure area nearest the location determined from the beacon signal.

In some examples, if the access module 410 determines that the user is entitled to access the secure area, access to the secure area may be provided to the user. That is, no additional identification information or authentication information may be needed to access the secure area in some examples. Rather, the identification of the user based on the determined location of the personal computing device of the user may be sufficient identification/authentication and, thus, access to the secure area may be provided (e.g., based only on the determined location).

In other examples, additional authenticating or identifying information may be requested from the user prior to providing access to the secure location. For instance, additional authentication module 414 may receive an indication from the access module 410 that the user identified is entitled or authorized to access the secure area. Accordingly, the additional authentication module 414 may generate a request for additional identifying and/or authenticating information and may transmit the request to the user. For instance, the request may be transmitted to the personal computing device 412a-412d of the user.

In some examples, the request for additional authenticating information may include a request for a personal identification number (PIN) of the user. Additionally or alternatively, biometric data of the user (e.g., finger print, thumb print, or the like) may be requested. In still other examples, answer(s) to one or more preset or predefined security questions may be requested. Any combination of these or various other authenticating methods may be requested. The requested authenticating information may be provided by the user via the personal computing device 412a-412d of the user and may be transmitted to additional authentication module 414 to determine whether the received information authenticates the user. If so, access may be provided to the secure area. If not, access may be denied or additional information (e.g., presentation of photographic identification of the user) may be requested or required.

The grant of access to the secure area may, in some examples, be transmitted to the personal computing device 412a-412d of the user. For instance, a user interface may display an indication that the user has been authenticated and may access the secure area. In some examples, additional information may also be provided to the user. For instance, diagram generating module 416 may generate one or more diagrams of the secure area to indicate, for instance, a location of an item associated with the user. For example, if a user is accessing a secure area housing a plurality of safe deposit boxes and the user is associated with one or more of the safe deposit boxes within the secure area, the diagram generating module 416 may generate a diagram of the secure area and may indicate (e.g., via highlighting, or the like) on the diagram, the location of the one or more safe deposit boxes associated with the user. The diagram may be transmitted to the personal computing device 412a-412d of the user.

The system 400 may further include a log module 418. The log module 418 may receive data associated with a user requesting or receiving access to a secure area, time of access, date of access, duration of access, and the like. This information may be stored in, for example, an electronic log, in order to maintain a record of individuals who access the secure area. The information stored in the log may be received from one or more other modules and/or from one or more devices or systems in communication with the system 400 (e.g., other systems associated with the entity 402 but not shown in FIG. 4).

Figure 5B:
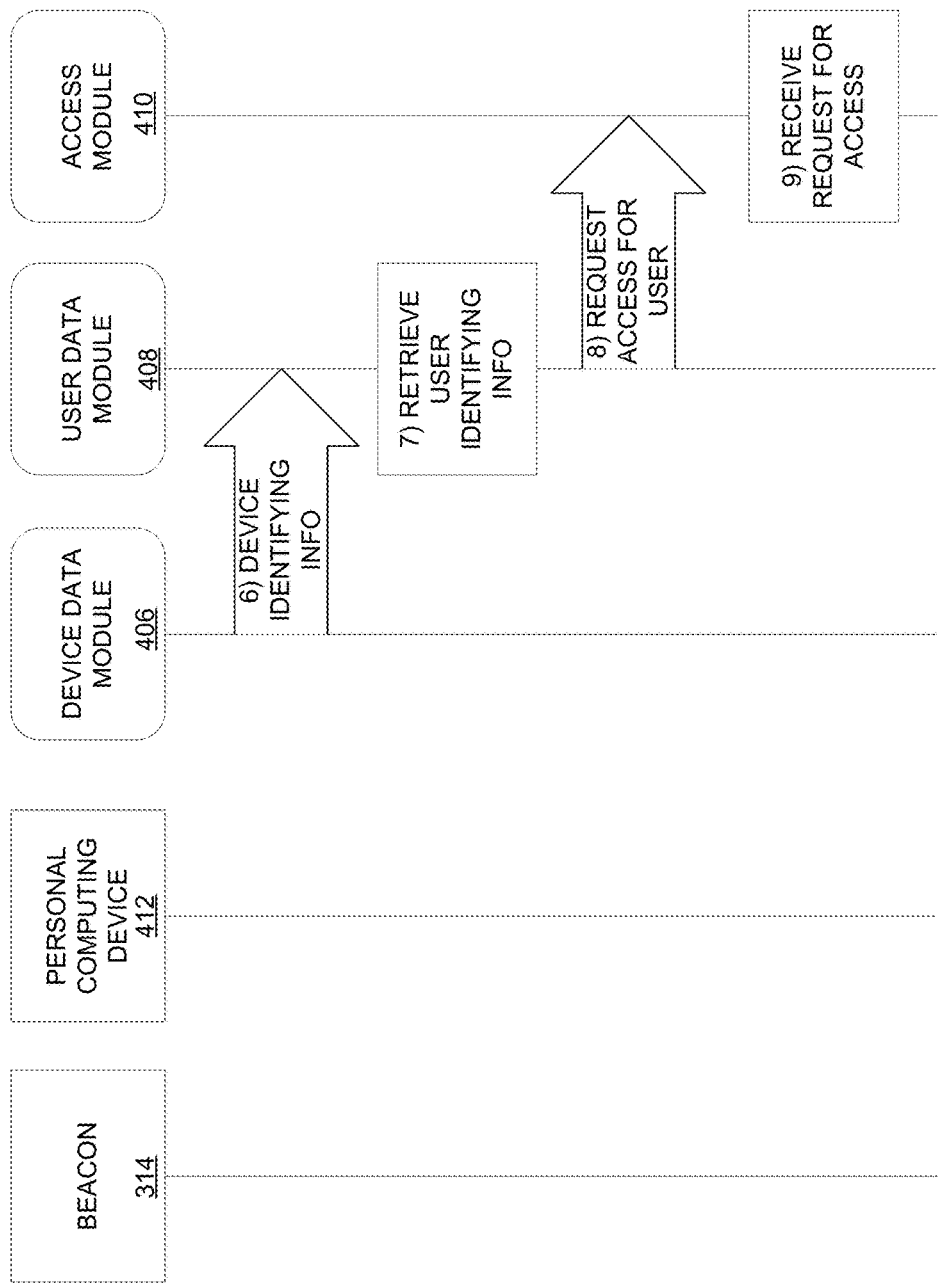

FIGS. 5A-5C depict an illustrative event sequence for utilizing a location determination and user identification system in accordance with one or more aspects discussed herein. The example shown in FIGS. 5A-5C is merely one example sequence and various other steps, processes, or the like, may be included in a sequence without departing from the invention.

Referring to FIG. 5A, at step 1 a signal may be emitted from one or more beacons, such as location beacons 314, 316, 318 in FIG. 3. The signal may include data identifying the beacon and/or a location of the beacon. In some examples, the beacon may be located in a branch or banking center of a financial institution. In some examples, a plurality of beacons may be arranged at various locations throughout the banking center and a determined location of a beacon may include the particular location of the beacon within the branch or banking center.

At step 2, the signal emitted by the beacon may be detected, such as by a personal computing device 412 associated with a user. As discussed above, the signal emitted by the beacon may be a low-power radio signal such that detection of the signal might be possible when the personal computing device is within a predefined proximity of the beacon. Accordingly, the personal computing device must be near to the beacon in order to detect the signal.

Based on the received signal, a location of the beacon, and, thus, an approximate location of the personal computing device, may be determined in step 3. For instance, in some examples, the personal computing device may include an application configured to communicate with the beacon and/or receive and/or provide information associated with the beacon, location, and the like, to a system associated with an entity, such as a financial institution. Example applications may include online banking applications and/or mobile banking applications. Accordingly, the application may detect the signal associated with the beacon and determine a location of the beacon (and thus an approximate location of the personal computing device). Determining the location of the beacon may be based on records stored on the personal computing device, or accessible via the online banking application or mobile banking application, identifying locations of beacons. For instance, the location of beacons in each branch of the financial institution may be accessible via the online banking application or mobile banking application.

Although the example above includes identifying the location of the beacon and/or the personal computing device by the personal computing device (or application associated therewith), in some arrangements, the signal or data associated with the signal, may be transmitted from the personal computing device to another computing device or server in order to identify the location. For instance, the signal or data associated therewith may be transmitted to a server at a back office of the financial institution, such as customer assistance computing platform 324 in FIG. 3. The location of the beacon, and approximate location of the personal computing device, may then be determined at the remote server or platform using processes similar to those discussed above.

At step 4, the determined location information may be transmitted, for instance to a device data module 406, to retrieve device identifying information in step 5. As discussed above, device identifying information may include IMEI of the device, and the like.

Referring to FIG. 5B, the location of the personal computing device, and identifying information retrieved associated with the personal computing device, may be transmitted, for instance, to the user data module 408 in step 6. The user data module 408 may receive the information and use, for instance at least the device identifying information, to identify a user associated with the personal computing device. Information associated with the identified user may be retrieved in step 7.

At step 8, a request for the identified user to access a secure area (e.g., a secure area within a predefined proximity of the beacon 314 from which a signal was detected in step 2) may be received. In some examples, the request to access the secure area may be performed automatically (e.g., upon determining the location and identity of the user, upon the personal computing device detecting the location beacon signal, or the like). In other examples, the request may be made by the user (e.g., via the personal computing device). The request may be transmitted to an access module 410 for processing. The request may be received at the access module 410 in step 9. With reference to FIG. 5C, at step 10, the access module may determine whether the identified user is entitled to access the secure area. Determining whether the user is entitled to access may include determining whether the user is included in a listing of individuals entitled to access, determining whether the user is associated with an item located within the secure area, and the like.

In step 11, if it is determined that the user is entitled to access, access to the area may be provided. An indication of this access may be transmitted to the personal computing device of the user in step 12 and the personal computing device may display the indication of access in step 13.

Various additional steps may be provided in this or other event sequences without departing from the invention. For instance, steps associated with requesting additional authenticating information, as discussed herein, may be provided in this or other event sequences without departing from the invention.

Figure 6:
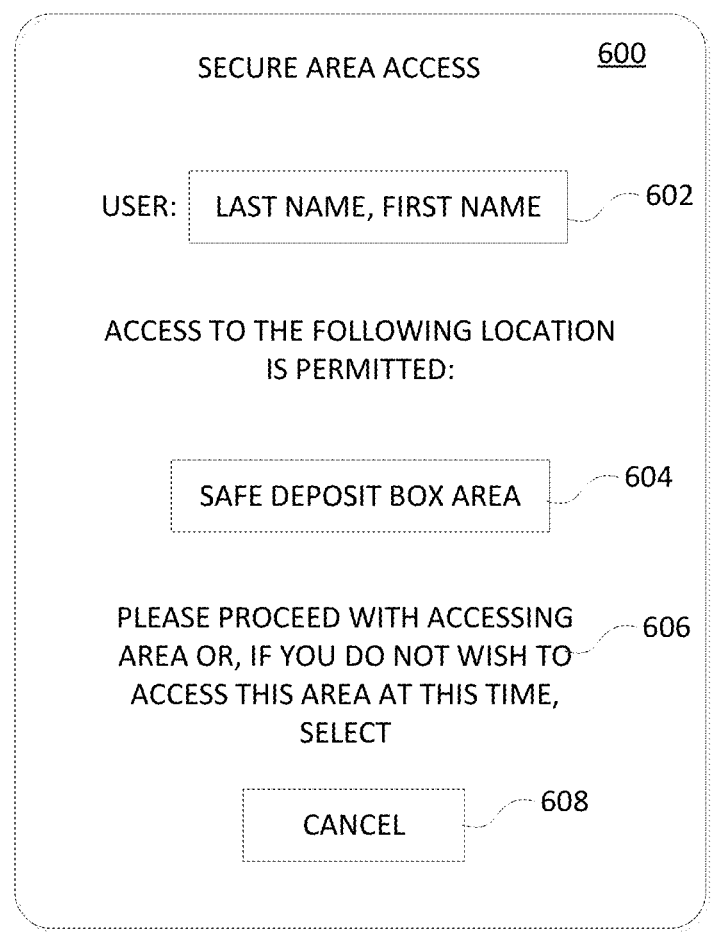
FIG. 6 illustrates one example user interface that may be displayed to a user, e.g., via a personal computing device of the user, indicating that access to the secure area is permitted, according to one or more aspects discussed herein.

FIG. 6 illustrates one example user interface indicating that access to the secure area has been permitted (such as provided in step 13 in FIG. 5C). The user interface 600 may be displayed on a personal computing device of the user. The user interface 600 includes field 602 in which the name of the user is indicated. The interface 600 may further include a field identifying the secure or other area to which the user has been granted access in field 604. For instance, the example interface 600 of FIG. 6 indicates that the user has been granted access to the safe deposit box area.

The interface 600 further includes additional instructions indicating that the user should proceed to the area or proceed with accessing the area in region 606. However, if a user does not desire to access the area (e.g., in arrangements in which the access is automatically provided based on the determined location of the user without any additional request for access by the user) the user may select "CANCEL" option 608 to cancel the access provided.

In some examples, access to the secure area may be provided for a limited time period. For instance, if the user does not access the secure area within a predetermined amount of time (e.g., five minutes, 10 minutes, or the like) of access being provided, the user receiving the indication on the personal computing device, or the like, the access may be cancelled or may expire and an additional request for access may be submitted.

Figure 7:
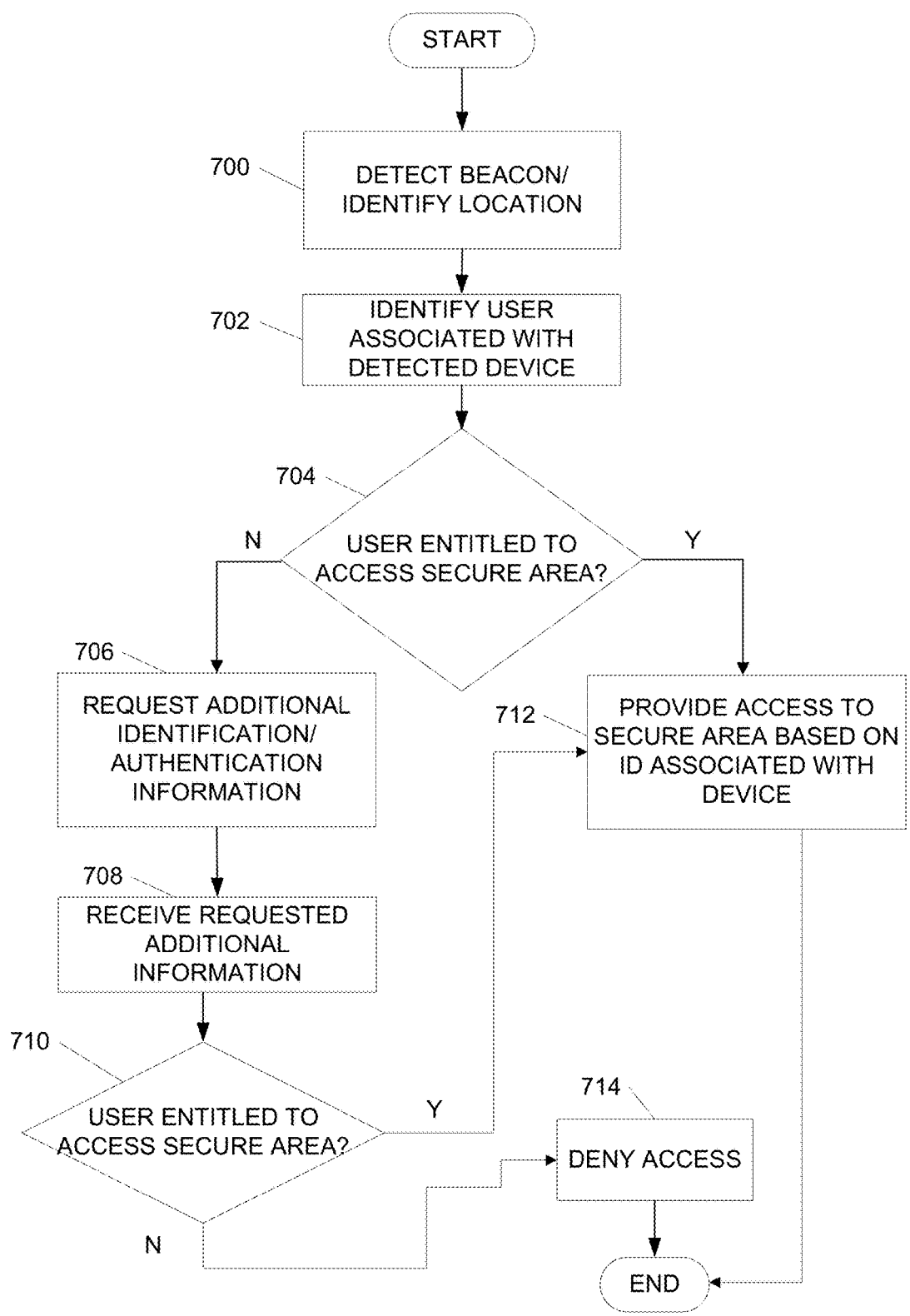
FIG. 7 illustrates one example method of identifying a user and/or providing access to a secure area according to one or more aspects discussed herein.

FIG. 7 illustrates one example method of identifying a user and/or providing access to a secure area according to one or more aspects discussed herein. In step 700, a signal from a beacon may be detected. As discussed above, the signal may be a low-power radio signal that may be detectable when a device, such as a personal computing device, is within a predefined proximity of the beacon. Based on the detected signal, a location of the beacon, and therefore an approximate location of the personal computing device may be determined, as discussed above.

In step 702, a user associated with the personal computing device may be determined. As discussed above, the personal computing device may include a unique identifier that may be used to identify a user associated with the personal computing device. The user identification may be performed based on information provided, for example, during a registration process.

In step 704, a determination is made as to whether the identified user is entitled to access the secure area. As discussed above, the secure area may be identified based on a proximity to the location of the beacon and/or personal computing device. Accordingly, if multiple beacons are arranged within a location (e.g., a branch or banking center of a financial institution), the secure area may be identified based on the proximity to the beacon from which the signal was detected. Access to other secure areas within the branch might not be provided based on the determined location, in some examples. That is, in some arrangements, access to only the secure area nearest the determined location of the beacon and/or personal computing device, may be provided. Access to other secure areas may require the user to request access or may require the user to move to a location nearer one of the other secure areas to enable the system to detect the location of the personal computing device nearer one of the other secure areas, thereby initiating the process of obtaining access to another secure area.

As discussed above, determining whether a user is entitled to access a secure area may be determined based on matching a name of the identified user associated with the personal computing device with a listing of users entitled to access (e.g., via a look-up table), determining whether the identified user is associated with an item within the secure area, or the like.

If, in step 704, a determination is made that the user is entitled to access the secure area, access may be provided to the user in step 712. Alternatively, if, in step 704, a determination is made that the user is not entitled to access the secure area, additional identification and/or authentication information may be requested in step 706. For instance, the user may be requested to provide photographic identification, such as a driver's license, in order to obtain access. The system may request that the user scan or capture an image of the driver's license in order to verify the identity of the user. In other examples, the system may request assistance from an associate of the financial institution. The associate may, in some arrangements, be provided with a location of the user within the branch based on the determined location of the personal computing device of the user.

In step 708, the requested additional identifying and/or authenticating information may be received. In step 710, a determination may be made as to whether, based on the additional information provided, the user is entitled to access to the secure area. If, in step 710, a determination is made that the user is entitled to access, access may be provided to the user in step 712. Alternatively, if, in step 710, a determination is made that the user is not entitled to access the secure area, access may be denied in step 714.

In some examples, permission to access the area or a denial of access to the secure area may be transmitted to a personal computing device of the user. For instance, the personal computing device may display an indication, e.g., via a user interface, of whether access to the secure area was permitted or denied.

Figure 8:
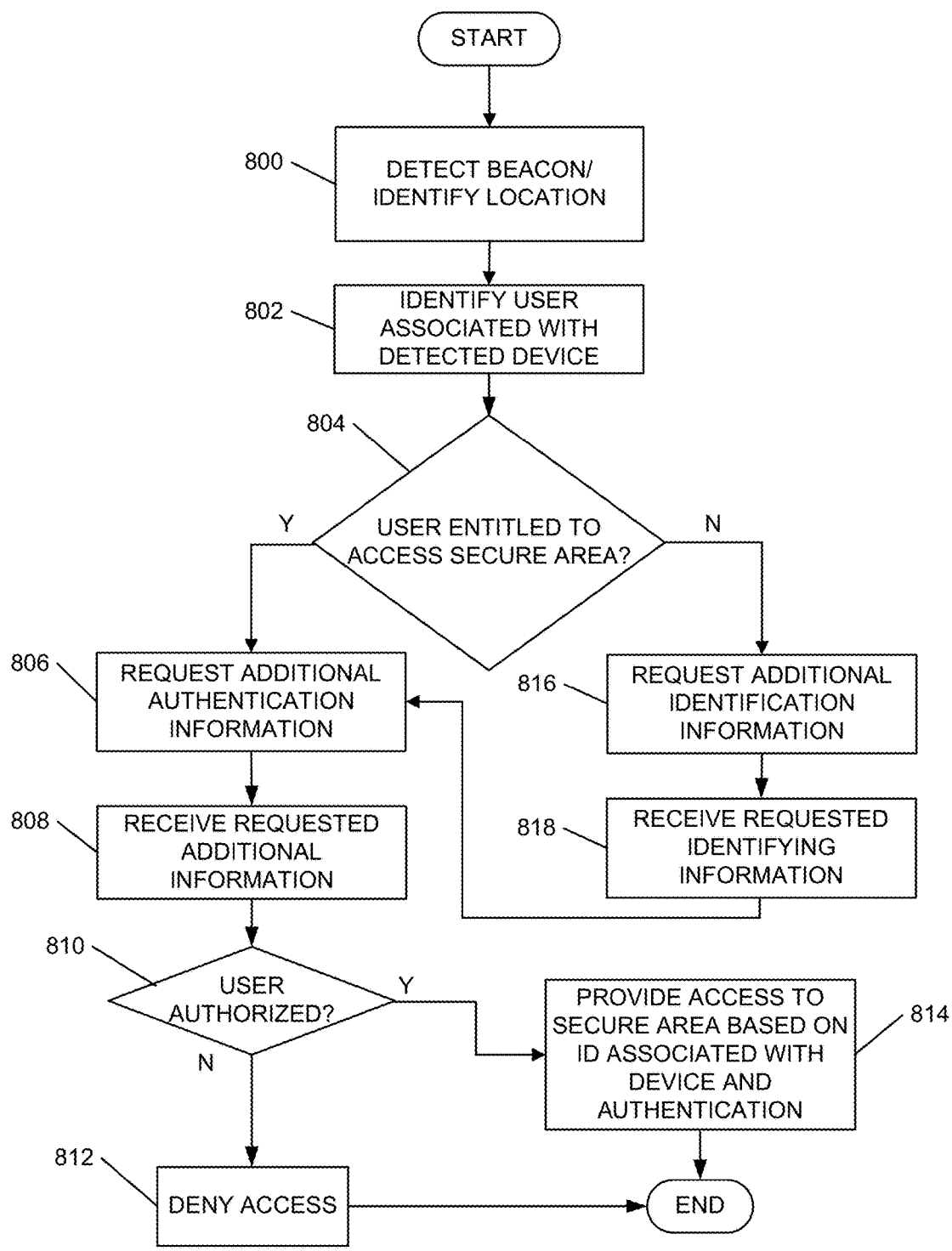
FIG. 8 illustrates another example method of identifying a user and/or providing access to a secure area according to one or more aspects discussed herein.

FIG. 8 illustrates another example method of identifying a user and/or providing access to a secure area according to one or more aspects described herein. In step 800, a signal from a beacon may be detected. As discussed above, the signal may be a low-power radio signal that may be detectable when a device, such as a personal computing device, is within a predefined proximity of the beacon. Based on the detected signal, a location of the beacon, and therefore an approximate location of the personal computing device may be determined, as discussed above.

In step 802, a user associated with the personal computing device may be determined. As discussed above, the personal computing device may include a unique identifier that may be used to identify a user associated with the personal computing device. The user identification may be performed based on information provided, for example, during a registration process.

In step 804, a determination is made as to whether the identified user is entitled to access the secure area. As discussed above, the secure area may be identified based on a proximity to the location of the beacon and/or personal computing device. Accordingly, if multiple beacons are arranged within a location (e.g., a branch of a financial institution), the secure area may be identified based on the proximity to the beacon from which the signal was detected. Access to other secure areas within the branch might not be provided based on the determined location, in some examples. That is, in some arrangements, access to only the secure area nearest the determined location of the beacon and/or personal computing device, may be provided. Access to other secure areas may require the user to request access or may require the user to move to a location nearer one of the other secure areas to enable the system to detect the location of the personal computing device nearer one of the other secure areas, thereby initiating the process of obtaining access to another secure area.

As discussed above, determining whether a user is entitled to access a secure area may be determined based on matching a name of the identified user associated with the personal computing device with a listing of users entitled to access (e.g., via a look-up table), determining whether the identified user is associated with an item within the secure area, or the like.

If, in step 804, a determination is made that the user is entitled to access the secure area, additional authenticating information may be requested in step 806. The request for additional authenticating information may be transmitted to, for instance, the personal computing device of the user. The user may input the requested additional authenticating information into the personal computing device. For instance, the requested additional authenticating information may include a personal identification number (PIN) of the user, biometric data of the user, answer to preset or predefined security question(s), or the like. This information may aid in confirming that the user associated with the personal computing device is the user physically present with the device at the location (e.g., to avoid unauthorized access or activity).

In step 808, the additional authenticating information may be received and, in step 810, a determination may be made as to whether the user is authorized to access the secure area. If, in step 810, the user is authorized to access the secure area, access to the secure area may be permitted and/or provided in step 814 and, in some examples, a notification of the access may be transmitted to the user (e.g., to the personal computing device of the user). If, in step 810, it is determined that the user is not authorized to access the secure area, access to the area may be denied in step 812 and, in some examples, a notification of the denial of access may be transmitted to the user (e.g., to the personal computing device of the user).

If, in step 804, a determination is made that the user is not entitled to access the secure area, additional identifying information may be requested from the user in step 816. For instance, similar to the arrangements discussed above, the user may be requested to provide photo identification, such as a driver's license, to confirm the identity of the user. The system may, in some examples, request a scan or image of the photographic identification to confirm the identity of the user. The requested identifying information may be received in step 818 and the process may continue at step 806 with a request for additional authenticating information.

Figure 11:
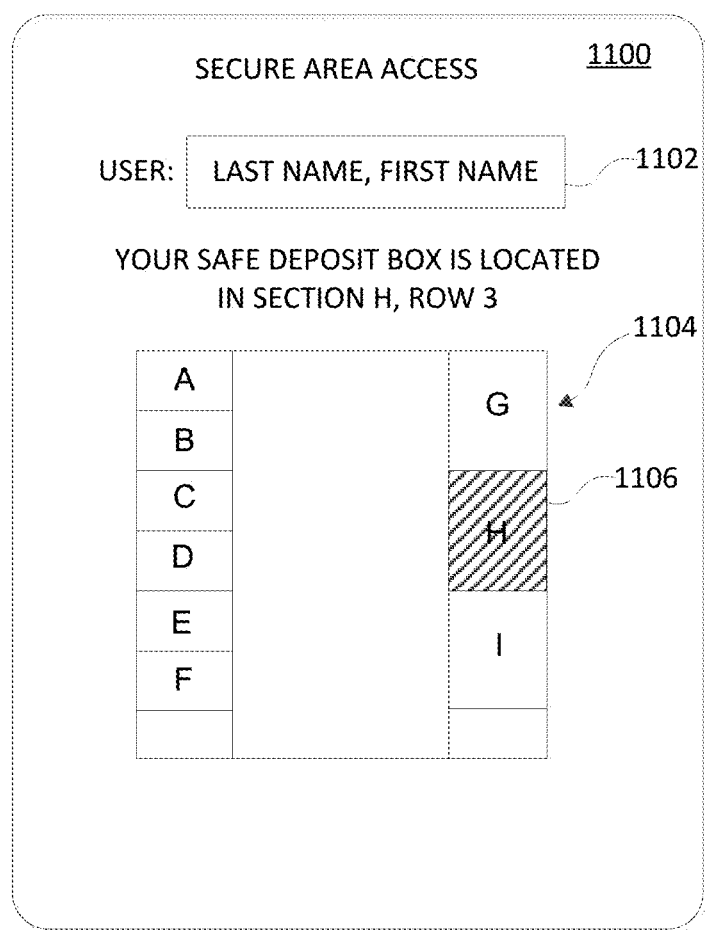
FIG. 11 illustrates one example user interface providing a diagram of the secure area and/or location information associated with an item in the secure area according to one or more aspects discussed herein.

FIGS. 9-11 illustrate various example user interfaces that may be provided to a user in accordance with one or more aspects described herein. For instance, FIG. 9 illustrates one example user interface 900 in which a user may be requested to provide additional authenticating information, such as a PIN. The interface 900 includes field 902 in which the user's name may be presented. Field 904 may identify the particular secure area to which the user is being provided access. Field 906 provides a region in which the user may enter his or her PIN in order to be authenticated to the system and authorized to access the secure area. Once the PIN has been entered, the user may select OK option to process the entry of the additional authenticating information, or may select BACK option to return to a previous interface.

FIG. 10 illustrates another example user interface 1000 in which the user may be requested to provide additional authenticating information, such as biometric data. Interface 1000 includes field 1002 in which the name of the user may appear. Similar to interface 900 of FIG. 9, interface 1000 further includes field 1004 in which the secure area to which the user is being provided access is identified. The interface 1000 further includes a request for biometric data, such as a fingerprint, to authenticate the user. The interface 1000 may include a region 1006 in which the user may be requested to provide the fingerprint or other biometric data. Once the requested data has been provided, the user may select OK option or BACK option, as desired.

FIG. 11 illustrates one example user interface 1100 illustrating a diagram of the secure area and identifying a location of an item associated with the user within the secure area. The interface 1100 includes field 1102 in which the name of the user is provided. The interface 1100 further includes region 1104 which may include a diagram or schematic diagram of the secure area. Region 1106 includes cross hatching to identify area H as the area in which, for example, the item associated with the user is located. The diagram provided in interface 1100 is merely one example interface that may be used to provide a diagram to the user. Various other diagrams, indications, and the like, may be provided to the user without departing from the invention.

Below are various example arrangements in which the location determination and user identification system may be implemented. The arrangements discussed below are merely some example arrangements and should not be viewed as limiting the disclosure in any way. Various other arrangements may be implemented or used without departing from the invention.

As discussed above, the location determination and user identification system may implement proximity positioning systems, or features associated therewith, to identify a user and determine a location of a user based on a determined location of a personal computing device associated with the user. Additional services and/or functionality may then be provided to the user, based on this information.

For example, the user may, as discussed above, be provided access to a secure area based on the determined location and identity of the user. In some examples, the secure area may be a safe deposit box area. In conventional systems, a safe deposit box may require a key to access the box itself. However, in some example arrangements discussed herein, the identification of the user based on the location of the personal computing device may reduce or eliminate the need for a key to the safe deposit box. Rather, the user may be provided access to the safe deposit box area, as discussed above, and may provide (either via the personal computing device of the user, an associated system, a receiving device within the safe deposit box area, or the like) additional authenticating information in order to access the safe deposit box. For instance, the user may provide a PIN or biometric data to access the safe deposit box. The PIN or biometric data may be provided in lieu of or in addition to a key.

In still other examples, upon the user being provided access to the secure area, a location of an item within the area may be transmitted to the user (e.g., to the personal computing device of the user), as discussed above. Additionally or alternatively, an indication of the location of the item within the secure area may be provided inside the secure area. For instance, a display may be provided within the secure area identifying a location of an item (e.g., a safe deposit box) associated with the user. Additionally or alternatively, an indicator, such as a light, may be provided on the item itself, and may illuminate upon the user accessing the secure area.

In some examples, additional offers may be provided to the user based on the determined location and identification. For instance, if a user is identified at a particular location (e.g., near a safe deposit box area), the user may be provided with one or more offers associated with the particular location. For instance, if the user is associated with a safe deposit box, the user may be provided with offers associated with obtaining additional safe deposit boxes, safe deposit boxes of differing sizes, or the like. Additionally or alternatively, if the user is determined to be near the safe deposit box area, but is not associated with any safe deposit boxes, an offer may be transmitted to the user (e.g., via the personal computing device of the user) to obtain a safe deposit box.

Further, although several services or functionalities may be provided to the user based on the identification of the user associated with the personal computing device, as discussed above, in some examples, particular types of services, transactions, or the like, may require additional identification, authentication, or the like. For instance, while a user may be permitted to access a safe deposit box area and/or a safe deposit box based on the systems and arrangements discussed herein, particular types of safe deposit box transactions may require additional information. For example, in order to close out a safe deposit box, the user may be requested to provide photo identification, signature, or the like. In another example, in order to purchase or obtain a safe deposit box, the user may be required to provide photo identification, signature, or the like. Various other types of transactions may require additional information without departing from the invention.

Although several examples discussed herein relate to providing access to a secure area, such as a safe deposit box area, similar arrangements may be used to provide access to other secure areas or types of areas. For instance, similar proximity positioning technology may be used to provide access to, for example, a vestibule housing an automated teller machine (ATM). The vestibule may include secure access (e.g., the user may be required to swipe his or her ATM card in order to obtain access to the vestibule). However, the arrangements discussed herein may be used to determine a location of the user near the vestibule and provide access to the vestibule.

For example, a location beacon (such as beacon 314, 316, 318 in FIG. 3) may be provided in or near the vestibule.

Accordingly, as a user approaches the vestibule with a personal computing device (e.g., cell phone, smartphone, tablet, or the like), the personal computing device of the user may detect the signal from the beacon and a location of the beacon, as well as the personal computing device of the user, may be determined. This information may be used to identify a user associated with the personal computing device (e.g., a unique identifier associated with the device may be transmitted to a system to determine the identity of the user associated with the device). A determination may then be made as to whether the user is entitled to access the vestibule (e.g., does the user have a valid account, ATM card, or the like) and, if so, access may be provided to the vestibule. In some arrangements, access may be provided to the vestibule without the user swiping the ATM card. That is, access may be provided based only on the information determined from the location, personal computing device, identity of the user, and the like.

In another example, the arrangements discussed herein may be used to provide access to a kiosk, such as a kiosk within a branch or banking center, that provides various services. The kiosk may include a beacon or have a beacon positioned nearby. Accordingly, as a user approaches the kiosk with a personal computing device that may detect the signal from the beacon, the user may be identified and the kiosk may be activated and/or particular display screens or services offered may be customized to the user.

Further, the arrangements discussed herein may include detection of a signal by a personal computing device and transmitting the signal, or data associated therewith, to another portion of the system or another device, to determine the location of the beacon and/or device, as well as the identity of the user associated with the device. However, in some arrangements, the personal computing device may be configured to determine the location of the beacon, and thus, the location of the personal computing device, based on the received signal (e.g. by matching a signal that may be unique to the beacon with a stored list of beacons and associated locations). Some or all aspects of this arrangement may be performed by one or more applications associated with the personal computing device, such as an online or mobile banking application. The application may then determine the identity of the user (e.g., with or without accessing other devices) and may transmit user information to another device or component of the system to provide the additional functionality, as discussed herein.

As discussed herein, the arrangements described herein aid in enhancing customer service experiences and in improving efficiency in various types of customer service activities.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
receiving, by a location determination and user identification system operating in a personal computing device having at least one processor, data associated with a signal from a location beacon, the signal being a low-power radio signal emitted from a location beacon at a banking center of a financial institution;
determining, by the location determination and user identification system operating in the personal computing device, a location of the personal computing device based on the received data associated with the signal emitted from the location beacon, wherein the location of the personal computing device is within a predefined proximity of a location of the location beacon;

identifying, by the location determination and user identification system, a unique identifier associated with the personal computing device within the predefined proximity of the location of the location beacon, the unique identifier including an international mobile station equipment identity (IMEI) of the personal computing device;

based on the unique identifier associated with the personal computing device within the predefined proximity of the location of the location beacon, identifying a user associated with the personal computing device within the predefined proximity of the location of the location beacon;

determining, by the location determination and user identification system, whether the identified user is entitled to access a secure area within the banking center;

responsive to determining that the user is entitled to access to the secure area, providing access to the secure area within the banking center to the user based on the identification of the user associated with the personal computing device, the access being provided for a predetermined amount of time;

determining whether the user has accessed the secure area within the predetermined amount of time; and responsive to determining that the user has not accessed the secure area within the predetermined amount of time, canceling the provided access.

2. The method of claim 1, further including, responsive to determining that the user is entitled to access to the secure area, requesting additional authenticating information from the user prior to providing access to the secure area.

3. The method of claim 2, wherein the requested additional authenticating information includes at least one of: a personal identification number (PIN) of the user and biometric data of the user.

4. The method of claim 2, further including:
receiving the requested additional authenticating information;
determining, based on the received additional authenticating information, whether the user is authorized to access the secure area; and
responsive to determining that the user is authorized to access the secure area, providing access to the secure area within the banking center to the user.

5. The method of claim 4, wherein receiving the requested additional authenticating information includes receiving, by the location determination and user identification system, the requested additional authenticating information from the personal computing device.

6. The method of claim 1, wherein providing access to the secure area includes generating a notification of access being permitted and transmitting the generated notification to the personal computing device.

7. The method of claim 1, further including generating, by the location determination and user identification system, a diagram of the secure area and transmitting the generated diagram to the personal computing device.

8. The method of claim 1, further including:
generating, by the location determination and user identification system, an electronic record of the provided access to the secure area.

9. The method of claim 1, further including:
responsive to determining that the user is not entitled to access to the secure area, requesting additional identifying information from the user.

10. An apparatus, comprising:
at least one processor; and
a memory storing instructions that when executed by the at least one processor cause the apparatus to:
receive data associated with a signal from a location beacon, the signal being a low-power radio signal emitted from a location beacon at a banking center of a financial institution;
determine a location of a personal computing device of a user based on the received data associated with the signal emitted from the location beacon, wherein the location of the personal computing device is within a predefined proximity of a location of the location beacon;
identify a unique identifier associated with the personal computing device within the predefined proximity of the location of the location beacon, the unique identifier including an international mobile station equipment identity (IMEI) of the personal computing device;
based on the unique identifier associated with the personal computing device within the predefined proximity of the location of the location beacon, identify a user associated with the personal computing device within the predefined proximity of the location of the location beacon;
determine whether the identified user is entitled to access a secure area within the banking center;
responsive to determining that the user is entitled to access to the secure area, provide access to the secure area within the banking center to the user based on the identification of the user associated with the personal computing device, the access being provided for a predetermined amount of time;
determine whether the user has accessed the secure area within the predetermined amount of time; and
responsive to determining that the user has not accessed the secure area within the predetermined amount of time, canceling the provided access.

11. The apparatus of claim 10, further including, instructions that, when executed, cause the apparatus to:
responsive to determining that the user is entitled to access to the secure area, request additional authenticating information from the user prior to providing access to the secure area.

12. The apparatus of claim 11, wherein the requested additional authenticating information includes at least one of: a personal identification number (PIN) of the user and biometric data of the user.

13. The apparatus of claim 11, further including instructions that, when executed, cause the apparatus to:
receive the requested additional authenticating information;
determine, based on the received additional authenticating information, whether the user is authorized to access the secure area; and
responsive to determining that the user is authorized to access the secure area, provide access to the secure area within the banking center to the user.

14. The apparatus of claim 13, wherein receiving the requested additional authenticating information includes receiving the requested additional authenticating information from the personal computing device.

15. The apparatus of claim 10, wherein providing access to the secure area includes generating a notification of access being permitted and transmitting the generated notification to the personal computing device.

16. The apparatus of claim 10, further including instructions that, when executed, cause the apparatus to:
generate an electronic record of the provided access to the secure area.

17. The apparatus of claim 10, further including instructions that, when executed, cause the apparatus to:
responsive to determining that the user is not entitled to access to the secure area, request additional identifying information from the user.

18. One or more non-transitory computer-readable media having instructions stored thereon that when executed by one or more computers cause the one or more computers to:
receive, by a personal computing device, data associated with a signal from a location beacon, the signal being a low-power radio signal emitted from a location beacon at a banking center of a financial institution;
determine a location of the personal computing device based on the received data associated with the signal emitted from the location beacon, wherein the location of the personal computing device is within a predefined proximity of a location of the location beacon;
identify a unique identifier associated with the personal computing device within the predefined proximity of the location of the location beacon, the unique identifier including an international mobile station equipment identity (IMEI) of the personal computing device;
based on the unique identifier associated with the personal computing device within the predefined proximity of the location of the location beacon, identify a user associated with the personal computing device within the predefined proximity of the location of the location beacon;
determine whether the identified user is entitled to access a secure area within the banking center;
responsive to determining that the user is entitled to access to the secure area, provide access to the secure area within the banking center to the user based on the identification of the user associated with the personal computing device, the access being provided for a predetermined amount of time;
determine whether the user has accessed the secure area within the predetermined amount of time; and
responsive to determining that the user has not accessed the secure area within the predetermined amount of time, canceling the provided access.

19. The one or more non-transitory computer-readable media of claim 18, further including, instructions that, when executed, cause the one or more computers to:
responsive to determining that the user is entitled to access to the secure area, request additional authenticating information from the user prior to providing access to the secure area.

20. The one or more non-transitory computer-readable media of claim 19, further including instructions that, when executed, cause the one or more computers to:
receive the requested additional authenticating information;
determine, based on the received additional authenticating information, whether the user is authorized to access the secure area; and
responsive to determining that the user is authorized to access the secure area, provide access to the secure area within the banking center to the user.

* * * * *